Sept. 17, 1968     H. WEDEMEYER ETAL     3,401,801
APPARATUS FOR SEPARATING THE LIQUID PHASE AND THE SOLID
PHASE IN MIXTURES OF LIQUID MATTER AND SOLID MATTER
Filed Aug. 22, 1966     2 Sheets-Sheet 1
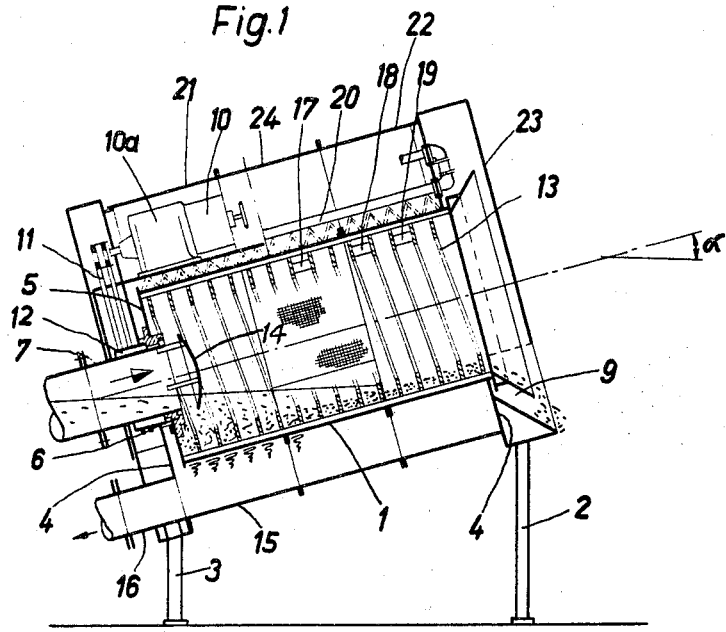
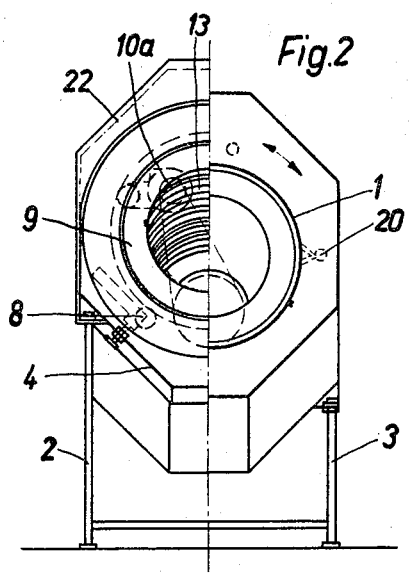
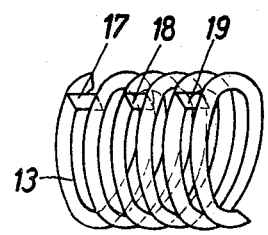

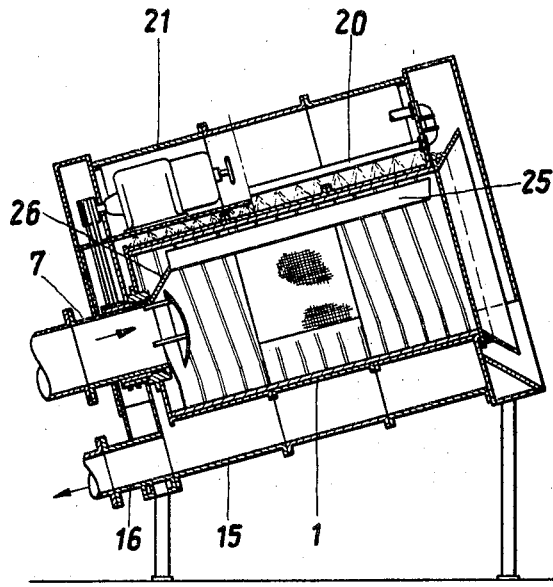
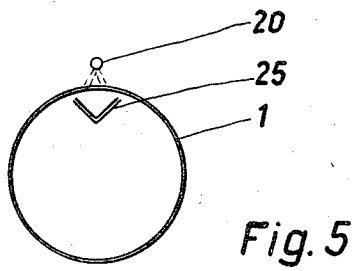

United States Patent Office 3,401,801
Patented Sept. 17, 1968

3,401,801
APPARATUS FOR SEPARATING THE LIQUID PHASE AND THE SOLID PHASE IN MIXTURES OF LIQUID MATTER AND SOLID MATTER
Heinrich Wedemeyer, Michelbach, and Willi Kreikenbaum, Naensen, Germany, assignors to Passavant-Werke, Michelbach, Nassau, Germany
Filed Aug. 22, 1966, Ser. No. 575,218
Claims priority, application Germany, Aug. 20, 1965, P 37,503
2 Claims. (Cl. 210—394)

ABSTRACT OF THE DISCLOSURE

Disclosed below is an improved apparatus of the above description wherein separation of liquid and solid matter is effected by means of an inclined, rotating, perforated drum including a worm conveyor rotating with the drum for transporting solid matter from one end of the drum to the other end thereof, and for lifting solid matter from the lower to the upper lateral side of the drum. The apparatus includes also auxiliary drum-cleaning means.

This invention relates to separation of liquid matter from solid matter in mixtures of liquid matter and solid matter, and it relates more particularly to an apparatus for performing such a separation.

The fluids to be treated may be of industrial origin and include various solid particles, or solid impurities, or they may be of agricultural origin such as, for instance, water which has previosuly been used for cleaning farm products such as, for instance, vegetables.

It is a general object of this invention to provide an improved apparatus for performing the separation of the fluid phase and the solid phase in mixtures of the kind which has been described above.

It is a more specific object of this invention to provide a separation device of the aforementioned description, which device is not subject to clogging by solid particles, and in particular fibrous matter, which is the main limitation, or drawback, of conventional sieve structures when used for separating the liquid phase and the solid phase of composite mixtures.

Another object of this invention is to provide a separation device of the aforementioned description which is more compact than comparable prior art devices, thus requiring less room, and less floor space.

Another object of this invention is to provide a highly flexible separation device of the aforementioned description capable of removing various solid particles even of very small size and of various fibrous character from the liquid phase of the mixture without the danger involved in performing this task with fine mesh sieves, i.e. clogging thereof.

Another object of this invention is to provide an apparatus of the above description which works progressively, i.e. wherein the fluid or water content of the mixture is reduced in successive steps, resulting in an output whose water content is reduced to any required, or desired, minimum.

These and other objects of the invention and advantages thereof will become more apparent from the accompanying drawings of two preferred embodiments of the invention;

In the drawings:

FIG. 1 is substantially a vertical section of an apparatus embodying this invention, the constituent sieve structure thereof having been indicated but locally and in front elevation;

FIG. 2 shows at the right side thereof diagrammatically a transverse section of the structure of FIG. 1, and on the left side thereof a side elevation of the structure of FIG. 1 seen from the right of FIG. 1 to the left thereof;

FIG. 3 is an isometric view of a detail of the structure of FIGS. 1 and 2;

FIG. 4 shows a modification of the structure of FIG. 1 in the same fashion as FIG. 1; and FIG. 5 shows diagrammatically a detail of the structure of FIG. 4, FIG. 5 being a transverse section of the structure shown in FIG. 4.

Referring now to the drawings, and more particularly to FIGS. 1–3 thereof, numeral 1 has been applied to indicate a rotatable perforated drum. Drum 1 is preferably made of a sieve material, or woven wire material, as locally indicated in FIG. 1. Drum 1 and other parts of the device are enclosed in a common housing to which reference numeral 4 has been applied. Housing 4 is supported by pillars, or uprights, 2 and 3. The left end surface of drum 1 is formed by an imperforate circular plate to which reference character 5 has been applied. Plate 5 is supported by a bearing 6 which, in turn, is supported by a first passage means or pipe 7. First passage means or pipe 7 is supported by the left end surface (see FIG. 1) of housing 4. Thus the left end of drum 1 is, in effect, rotatably supported by drum housing 4.

The first passage means or pipe 7 is intended to admit a mixture of liquid and solid matter into drum 1, the direction of flow having been indicated by an arrow positioned inside of first passage means or pipe 7. The end of drum 1 remote from pipe 7 rests on, and is supported by, rollers 8 which have been indicated in FIG. 2. If drum 1 is relatively long it should be supported by rollers intermediate the ends thereof, and such rollers may be arranged, if necessary, or desirable, at several points along the length of drum 1. Drum 1 is open at the other end surface thereof and forms a second passage means for removing matter of reduced liquid content from drum 1. The end of said second passage means is in the shape of a frustum of a cone to which reference character 9 has been applied.

Drum 1 may be rotated by an electric motor 10 arranged inside of housing 4. Motor 10 operates by means of a pinion (not shown) a transmission whose transmission ratio is continuously variable to impart any desired speed of rotation to drum 1. The left end of the shaft of transmission 10a supports pulleys for driving a pair of endless belts to which reference character 11 has been applied. Endless belts form a pair of loops frictionally engaging the outer surface of hollow shaft 12 arranged in coaxial relation to pipe 7 and surrounding the latter. Hollow shaft 12 is integral with the end surface 5 of drum 1, and thus transmits the rotary motion of motor 10 to drum 1.

Reference numeral 13 has been applied to indicate a screw-thread-shaped insert arranged inside of, and integral with, drum 1, i.e. jointly rotatable with drum 1. Insert 13 is arranged in coaxial relation to drum 1 at the inner surface thereof. The constituent screw threads of insert 13 extend radially inwardly from the inner surface of drum 1. Insert 13 is mainly intended to operate as a worm conveyer, conveyer screw, or feed screw.

It will be apparent from FIG. 1 that drum 1 is inclined, reference character α having been applied to indicate the inclination thereof. The preferred range of inclinations of the axis of drum 1 is 10 degrees to 15 degrees.

Pipe 7 is arranged in coaxial relation to drum 1. A flow-controlling baffle 14 is arranged inside of drum 1 adjacent the downstream end of first passage means of pipe 7. This baffle effects an even distribution of the liquid admitted to drum 1 through pipe 7. The aforementioned baffle tends also to prevent solid matter which has settled inside of drum 1 to be stirred up by liquid admitted to it through pipe 7. Fluid which reaches the lower side of perforated drum 1 is drained away from drum 1 by means of a liquid-collecting tray 15 arranged below drum 1 and having substantially the same length as drum 1. Tray 15 is defined by the wall of housing 4 or, in other words, housing 4 is shaped in such a fashion that a portion of the wall thereof forms tray 15. Reference numeral 16 has been applied to indicate a pipe for draining liquid collected in tray 15. The direction of the flow of liquid out of tray 15 and through pipe 16 has been indicated by an arrow at the left end of pipe 16 (see FIG. 1).

Solid matter which has been separated from the liquid phase of the mixture is collected in the helical grooves formed by helical insert 13. As mentioned before, helical insert 13 operates substantially as a conveyer moving solid matter from the intake side of the device to the discharge side thereof where it is dumped through part 9 in the shape of the frustum of a cone, as clearly shown in FIG. 1. As solid matter travels inside of the helical grooves defined by insert 13 from left to right—as seen in FIG. 1—it is caused to continually engage other portions of the perforated or sieve surface of drum 1, thus causing progressive removal of liquid, or dehydration, of the substance contained in the helical groove defined by part 13. The steeper the angle of inclination $\alpha$ of drum 1, the longer the dwelling time of material inside of the helical groove defined by insert 13, and the more complete the removal of liquid from the substances being processed inside of the device. The inclination of drum 1 should, however, not substantially exceed the above referred-to range of preferred inclinations.

The dried substance dumped at the right end of the device as seen in FIG. 1 may be disposed of in any desired way, e.g. it may be carted away.

Reference numerals 17, 18, 19 have been applied to indicate partitions, blades, or shovels, extending substantially transversely across the helical grooves defined by insert 13. Partitions 17, 18, 19 are preferably arranged adjacent the dumping end of drum 1, which in FIG. 1 is the right end thereof. Partitions 17, 18, 19 carry solid matter which is supported by them, or in physical contact with them, close to the peak of their trajectory. From there the semi-humid solid matter drops down to the bottom or lower portion of drum 1. The considerable impact of humid substances dropping from near the apex of the trajectory of partitions or shovels 17, 18, 19 down to the lower portion of drum 1 is conducive to an augmented separation of the solid phase and the liquid phase of the humid substances.

Adjacent the left end of the structure of FIG. 1 the liquid content of the mixture is relatively high, and separation of the liquid and of the solid phase is achieved in this region mainly by the screen action of drum 1. Adjacent the right end of drum 1—as seen in FIG. 1—the liquid content of the mixture is relatively small and can hardly be reduced significantly by screen means as such. The aforementioned dropping process is conducive to an increased removal of liquid which could not possibly be achieved by screen means as such. The last partition or shovel 19 should not be arranged too close to the dumping end of the device because, if placed in that position, it may impair the proper and desired dumping action of helical conveyer element 13.

Drum 1 may conceivably be made of a single, or unitary, piece of wire mesh formed into a cylinder. It has, however, been found to be desirable to sectionalize the surface of drum 1 so that it includes a plurality of separate surface sections which are mechanically integrated into a unitary drum structure. This greatly facilitates the replacement of portions of the drum which may have been damaged, and greatly increases the load-carrying capacity of the drum. Another advantage of sectionalizing the surface of the drum resides in the fact that surface elements having different mesh width may readily be combined into an integral drum structure. It has been found desirable in certain instances to form a drum of sections having a maximal mesh width in the order of ½" and a minimal mesh width of less than 0.005". Different portions of the surface of the drum may be made of different materials ranging from plastic screens to Phosphor bronze screens.

The speed of rotation of drum 1 depends upon the material to be processed therein. Generally 5 to 25 r.p.m. are indicated. The speed of rotation must be sufficiently low to allow the liquid phase, or the water, to be drained off through pipe 16. The longer the drum, and the wider the mesh of the constituent sieve, or screen, thereof, the higher speeds of rotation, or number of revolutions per minute, that may be permissible, or advisable.

The solid matter which is present in the helical grooves between the screw-threads of part 13 and adheres to the inner surface of the drum must be removed from it by mechanical means, if not dropping down alone by the action of gravity.

It will be understood that the process of lifting solid matter from the lower level of drum 1 to higher levels thereof is in itself conducive to a separation of the solid phase and the liquid phase of the mixture.

Reference numeral 20 has been applied to indicate a fluid admission pipe for a drum-cleaning-medium arranged outside of drum 1, parallel to the axis thereof, having substantially the same length as drum 1, and having nozzles producing sprays of cleaning medium directed against the surface of drum 1. These sprays have been clearly shown in FIG. 1. The cleaning medium for cleaning or unclogging drum 1 may be a liquid, or a gas, such as air, or steam, the choice of the preferred cleaning medium depending upon the particular circumstances of the case. It may be desirable to provide a plurality of angularly displaced cleaning pipes for the admission of a drum-cleaning-medium and such pipes may be provided with means for pivoting the same about the axis of drum 1. An angle of pivotal movement of 90 degrees to pivot the aforementioned pipes to limit positions which are apart 90 degrees may be desirable in particular instances where separation conditions vary within a relatively wide range.

In case that drum 1 is made up of separate sections it may be desirable to form the sections adjacent the intake end by a screen material which has relatively large perforations and to form the sections adjacent the dumping end for solid matter by a screen material having relatively small perforations. The sections adjacent the left end surface 5 of drum 1 may be made of a relatively coarse mesh screen and the sections of drum 1 adjacent the opposite end surface thereof may be made of relatively fine mesh screen.

The dimensions of drum 1 may vary within wide limits. A very effective device may have a drum 1 having a diameter of about 3 feet and a length of about 12 feet.

FIG. 1 shows a drum 1 which comprises three coaxial stacked drum sections each including a screw-thread-shaped insert section. The three drum sections are oriented angularly in such a way that the screw-threaded insert sections thereof join to form a continuous, or uninterrupted, screw-threaded from one end surface of drum 1 to the other end surface thereof. Such a composite drum makes it readily possible to combine various different stack units to achieve different effects with different mixtures of liquid matter and solid matter. Such stacks can be made up of standard size sub-units, or standard subassembly units and this, in turn, makes it possible to retain the same housing 4 for various internal composite drum structures.

The flexibility of the device can further be increased by sectionalizing housing 4 in transverse direction, i.e. by forming housing 4 by a plurality of superimposed housing stacks. This has been shown in FIG. 1 where reference numerals 21, 22 and 24 have been applied to indicate the constituent stack portions of a composite stacked housing including three stack units. Stack units 21 and 22 are invariable building blocks for a number of different liquid extraction systems embodying the present invention. The intermediate stack unit 24 may be interchanged for a longer one, or for a shorter one, depending upon the length of the particular drum 1 required to best perform a particular task of separating fluid from solid matter, and vice versa.

The structure of FIGS. 4 and 5 is substantially identical with that of FIGS. 1 to 3, and will be described only to the extent that it differs significantly from the structure of FIGS. 1–3.

As shown in FIGS. 4 and 5, the device is provided with a fluid admission pipe 7 for admitting to rotatable drum 1 a medium to be processed. Pipe 20 of FIG. 4 is the equivalent of pipe 20 of FIG. 1 or, in other words, their structural features and their functional features are identical. The structure of FIGS. 4 and 5 differs from that of FIGS. 1 and 2 by the presence of a channel means 25 inside of drum 1 extending substantially parallel to cleaning fluid or cleaning medium admission pipe 20 and arranged to receive the drum-cleaning-medium sprayed from the nozzles of pipe 20. As shown in FIG. 4, channel means 25 is supported by a bracket 26. Channel means 25 may communicate with fluid admission pipe 7 to drain drum-cleaning medium from channel means 25 into pipe 7. As an alternative which is shown in FIG. 4, fluid collected in channel means 25 might be directly discharged to the end of drum 1 adjacent its end surface 5.

Channel means 25 may be associated with an additional nozzle arranged at the right end thereof (as seen in FIG. 4) to flush solid matter which has collected in channel means 25 out of the same. Channel means 25 ought to be shaped in such a fashion as to safely preclude cleaning liquid intended to be sprayed into channel means 25 from being sprayed past channel means 25 into the portion of drum 1 near the solid matter dumping end thereof. This would, of course, result in a re-humidification of solid matter which has previously been separated from the liquid phase of the mixture and dried.

Best results are obtained if the mixture of fluid and solid matter admitted to passage 7 is passed through any conventional prior art screen structure preparatory to its admission to the devices shown in FIGS. 1–5. In other words, the de-humidifying or liquid separation process should be performed in two consecutive steps. The first step consists in removing from the mixture excess fluid by processing the mixture in a conventional screen structure which may have meshes sufficiently large to positively preclude clogging thereof. Only after such pre-processing of the mixture of fluid and solid matter the same is admitted to the devices of FIGS. 1–5. This dual step process results in a much more complete moisture removal than could be achieved if the fluid admitted to duct 7 had not been pre-screened.

Relatively large particles of solid matter collected on the inner surface of drum 1 reduce, in effect, the size of the meshes of the drum screen. Such particles form bridges across the openings in the screen which operate in the way of a so-called filter aid, i.e. they retain particles of relatively smaller size on the inner surface of the drum. This effect is particularly significant when the structure of FIGS. 1–5 is applied for dehydrating sludge. In that instance the size of particles of solid matter held on the inner surface of drum 1 may be much smaller than the size of the meshes of the screen on which they are deposited.

It will be apparent from the foregoing that we have illustrated and described two preferred embodiments of our invention and that various alterations may be made therein without departing from the spirit and scope of the appended claims.

We claim as our invention:

1. An apparatus for separating liquid matter from solid matter in mixtures of liquid matter and solid matter including, in combination:
 (a) a rotatable perforated drum, the surface of said drum defining relatively large perforations adjacent one end thereof and defining relatively small perforations adjacent the other end thereof;
 (b) means for rotating said drum;
 (c) first passage means for admitting mixtures of liquid matter and solid matter into said drum through drum closing means forming one of the end surfaces of said drum, said first passage means being arranged adjacent the end of said drum where the surface thereof defines relatively large perforations;
 (d) second passage means for removing matter of reduced content of liquid from said drum arranged adjacent the other of the end surfaces of said drum, said second passage means being arranged adjacent the end of the drum where the surface thereof defines relatively small perforations;
 (e) a screw-shaped insert arranged inside of and in coaxial relation to said drum at the inner surface thereof and jointly movable with said drum, the constituent screw-threads of said insert extending radially inwardly from said inner surface of said drum and said insert operating as a worm conveyor;
 (f) a fluid admission pipe for drum-cleaning liquid arranged outside of said drum parallel to the axis thereof having substantially the same length as said drum and having nozzles producing sprays of cleaning liquid directed against the surface of said drum; and
 (g) channel means inside said drum extending substantially parallel to said fluid admission pipe and arranged to collect a drum-cleaning liquid sprayed out of said nozzles of said fluid admission pipe, said channel means defining a discharge opening for said drum-cleaning liquid situated immediately adjacent said drum closing means to drain drum-cleaning fluid from said channel means adjacent said first passage means.

2. An apparatus for separating liquid matter from solid matter in mixtures of liquid matter and solid matter including, in combination:
 (a) a rotatable perforated drum having an inclined axis, one end of said drum being situated at a relatively low level and the other end of said drum being situated at a relatively high level, said drum being made up of modular separate and separable stacked drum-shaped sections of which the sections situated at said relatively low-level end have relatively large perforations and the sections situated at said high-level end have relatively small perforations, said apparatus including a straight pipe for drum cleaning liquid arranged outside said drum and having nozzles producing sprays of drum cleaning liquid directed against the surface of said drum, and said apparatus further including channel means inside said drum for collecting drum cleaning liquid sprayed out of said nozzles, said channel means being inclined toward said relatively low-level end of said drum and defining a discharge opening situated adjacent said low-level end of said drum;
 (b) means for rotating said drum;
 (c) first passage means for admitting mixtures of liquid matter and solid matter into said drum through the end surface thereof situated at a relatively low level;
 (d) second passage means for removing matter of reduced content of liquid from said drum arranged adjacent said end of said drum situated at a relatively high level; and
 (e) a screw-shaped insert arranged inside of and in coaxial relation to said drum at the inner surface thereof, and jointly movable with said drum, the constituent screw threads of said insert extending radially inwardly from said inner surface of said drum and said insert operating as a worm conveyor transporting solid matter from said end of said drum situated at a relatively low level to said end of said drum situated at a relatively high level.

References Cited

UNITED STATES PATENTS

| | | | |
|---|---|---|---|
| 869,720 | 10/1907 | Matthias | 210—394 |
| 1,024,230 | 4/1912 | Turner et al. | 210—252 X |
| 2,064,403 | 12/1936 | Barker | 210—394 |
| 2,078,235 | 4/1937 | Chapman | 210—262 X |
| 2,664,204 | 12/1953 | Hurter | 210—403 |
| 2,750,855 | 6/1956 | Lathrop | 210—403 X |
| 2,148,903 | 2/1939 | Garnsey | 210—394 |
| 3,263,815 | 8/1966 | Golucke et al. | 210—380 X |

OTHER REFERENCES

German Printed Application No. 1,120,378, December 1961.

REUBEN FRIEDMAN, *Primary Examiner.*

J. DECESARE, *Assistant Examiner.*